Feb. 3, 1970    H. VIVEIROS    3,492,752
HOOK MECHANISM FOR CAPTURING FISH AND OTHER ANIMALS
Filed March 28, 1968

INVENTOR.
HENRY VIVEIROS
BY
*J. Rosenblum*
ATTORNEY

United States Patent Office 3,492,752
Patented Feb. 3, 1970

3,492,752
HOOK MECHANISM FOR CAPTURING FISH AND OTHER ANIMALS
Henry Viveiros, 1983 Camden Ave., San Jose, Calif. 95124
Filed Mar. 28, 1968, Ser. No. 716,721
Int. Cl. A01k 83/02, 83/06, 97/04
U.S. Cl. 43—36                     2 Claims

ABSTRACT OF THE DISCLOSURE

A hook mechanism for capturing fish or other animals comprising a torsion spring with two arms disposed in angular relationship when the spring is in an unstressed condition and releaseably retained in a crossed position in a stressed condition by means of a loop in one of the arms or a slotted bead rotatably mounted on one of the arms. A hook is secured at the end at the end of one spring arm and either a second hook, a bead or a sleeve is secured at the end of the other arm. A slotted rubber or plastic tube is disposed in flexed relationship around the hook shank to retain soft bait therein. Upon application of pressure to the mechanism by a fish's or animal's mouth, the arm engaged by the loop or rotatable slotted bead is released therefrom and springs to the open unstressed condition to catpure the fish or animal.

---

The present invention relates to an improved hook mechanism for use in capturing fish and other animals.

Presently available fish hooks, once attached to the mouth of a fish, frequently become dislodged or "spit out." The relative ease with which such hooks can be dislodged also prevents their effective use in catpuring animals other than fish.

One feature of the present invention is the provision of a spring-loaded hook which automatically springs open when pressure is applied thereto by a land or water animal taking the bait. The spring action sets the hooks within the animal's mouth, and the hooks pierce deeper into the mouth by the action of the animal. Under these circumstances, it is extremely difficult for the animal to become dislodged from the hook.

Presently available fish hooks encounter further problems when used with soft bait. During casting, the bait often breaks away from the hook. Fish can easily steal the soft bait without becoming lodged on the hook. Turbulent waters can dislodge the bait from the hook. And small fish can interfere with the fishing operations by stealing the bait. As a consequence, the fishing line must be retrieved periodically to see if the bait is intact. Moreover, when using the spring-loaded hook, inadvertent triggering of the spring can impart sufficient momentum to dislodge the bait from the hook.

Another feature of the present invention is the provision of a flexible bait trap, useful with both conventional hooks and spring-loaded hooks, which trap serves to retain soft bait on the hook under the above-described conditions.

Still another problem of presently available fish hooks is the relative ineffectiveness and unreliability of provisions made to prevent the snagging of the hook on weeds and other objects.

Thus a further object of the present invention is the provision of means mounted on the end of a dependent wire portion for guarding the point of the hook against snagging, said means being useful with both conventional hooks and spring-loaded hooks.

These and other features and advantages of the present invention will become more apparent upon a consideration of the following description taken in connection with the accompanying drawing, wherein.

Figure 2:
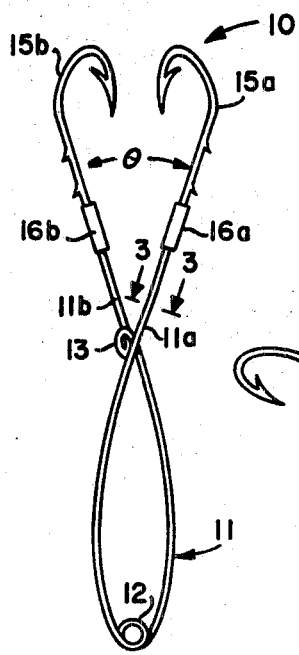
FIGURE 2 is an elevational view of the hook mechanism of FIGURE 1, shown in the loaded condition.
Figure 3:
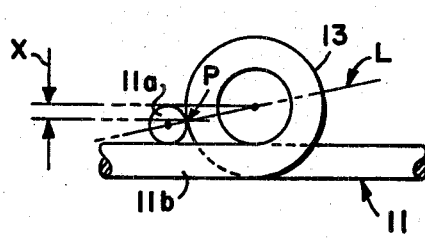
FIGURE 3 is an enlarged fragmentary sectional view taken along line 3-3 in FIGURE 2.
Figure 1:
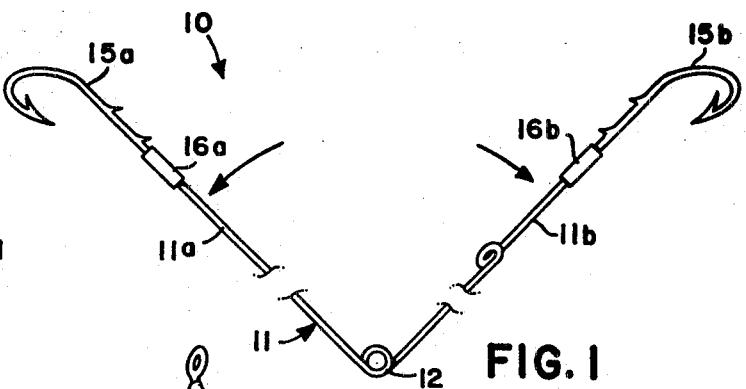
FIGURE 1 is an elevational view of a spring-loaded hook mechanism in accordance with the present invention, shown in the unloaded condition.

Referring to FIGURES 1, 2, and 3, a hook mechanism 10 in accordance with the present invention comprises a length of spring wire 11 coiled by means of one or more loops into a torsion spring 12 approximately midway of the two spring ends or arms 11a and 11b. When the spring 12 is in the unstressed state, the two arms 11a and 11b are angularly disposed as shown in FIGURE 1. A locking loop 13 is formed in the arm 11b in a plane approximately perpendicular to the plane defined by the spring arms 11a and 11b. Conventional barbed fishing hooks 15a and 15b are fixedly secured at ends of the shanks thereof to the ends of the respective spring arms 11a and 11b by respective roll pins 16a and 16b.

To operate the hook mechanism 10, one or both of the hooks 15a and 15b is baited. The mechanism 10 is held with the spring 12, in the unstressed condition as shown in FIGURE 1, between the thumb and forefinger of one hand. The thumb and forefinger of the other hand is then used to cross the arm 11a over the locking loop 13 of the arm 11b, as shown in FIGURE 2. The spring 12 is now under tension whereby's a torsion loading is transmitted to the spring arm 11a, and the arm 11a is thereby urged against the loop 13 in locking relationship.

At this point, any significant pressure applied by the mouth of a fish or other animal to the mechanism 10 will cause the arm 11a to jump or cam over the locking loop 13 whereupon the action of the loaded spring 12 causes the arms 11a and 11b to fly apart to the unstressed position of FIGURE 1. The resulting impact sets the hooks 15a and 15b within the animal's mouth, and any attempt to dislodge the hooks will simply cause the hooks to pierce deeper into the mouth under the force of the spring 12.

The threshold pressure necessary for triggering the release of the arm 11a from the locking loop 13 can be varied by adjusting the angle of the plan of loop 13 relative to the plane of the spring arms 11a and 11b. If the plane of the loop 13 is canted outward from the engaged portion of the arm 11a, a faster release requiring less pressure is effected. Conversely, if the plane of the loop 13 is canted inward, a delayed release requiring more more pressure (as may be desirable for casting and trolling operations) is effected.

In order to cam free of the locking loop 13, it is necessary for the retained spring arm 11a to move into quadrature relationship along the loop 13 with respect to the spring arm 11b. Referring to FIGURE 3, it can be seen that the required distance of travel before release is the distance X between the tangent point P between the wire 11a and the loop 13, and the center of the loop 13. The tangent point P always lies along the line L interconnecting the axis of the arm 11a and the center of the loop 13. For optimum triggering sensitivity, the distance X should be approximately equal to one-half the diameter of the wire 11a in which case the diameter of the locking loop 13 is approximately four times the diameter of the wire 11, as shown in FIGURE 3. For example, a hook mechanism 10 in which the wire 11 is three-mil diameter stainless steel with a loop 13 of one-eighth inch diameter has been found to be quite satisfactory.

The angle of the plane of the loop 13 with respect to the direction of the spring arm 11b determines the angle $\theta$ between the spring arms 11a and 11b in the retained loaded condition as shown in FIGURE 2. This angle in turn determines the amount of torsion in the spring 12 and hence the impact imparted by the hooks 15a and 15b upon triggering. For a spring 12 consisting of two three-eighths inch diameter loops of three-mil diameter stainless steel wire, a satisfactory angle $\theta$ is approximately 36°, the two spring arms being at approximately right angles in the unstressed condition (FIGURE 1).

It should be noted that the spring-loaded hook mechanism will be activated for effective capture when the animal's mouth is pierced by the barbs of the hooks 15a and 15b and the animal either opens its mouth or attempts to pull away, or when the animal's mouth otherwise applies any significant pressure to the shanks of the hooks 15a and 15b or to the spring arms 11a and 11b. It should further be noted that one of the hooks may be a large hook with live bait while the other hook is a small unbaited hook, in which case the mechanism 10 springs open in the animal's mouth upon taking the bait and the small hook pierces into the animal's mouth. A lure may, of course, be used in the place of the live bait.

Figures 4, 5:
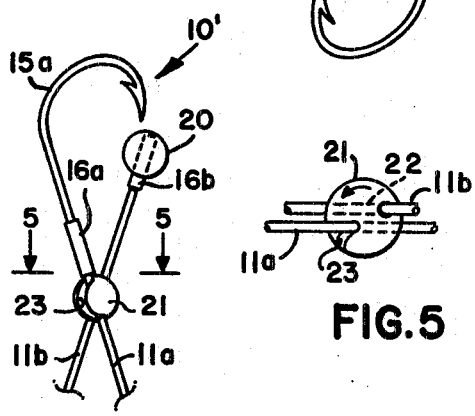
FIGURE 4 is a fragmentary elevational view of a modification of the spring-loaded hook mechanism of FIGURE 1, shown in the loaded condition and including a bead-type snag guard in accordance with the present invention.
FIGURE 5 is an enlarged fragmentary sectional view taken along line 5-5 in FIGURE 4.

FIGURES 4 and 5 illustrate a modification 10' of the hook mechanism 10 of FIGURES 1 through 3. In this modification, the hook 15b is replaced by a bead 20 mounted on the roll pin 16b at the end of the spring arm 11b. In the retained loaded position, the pointed end of the hook 15a is positioned directly adjacent the outer surface of the bead 20. Using a hook 15a of the barbless type, the outer surfaces of the hook mechanism 10' are smooth, thereby constituting a so-called "weedless" hook which will not snap on weeds, kelp, debris or other objects. It is apparent that the enlarged hook-protecting body 20 may be of various shapes in addition to spherical.

Also in the hook mechanism 10' of FIGURES 4 and 5, the locking loop 13 of the hook mechanism 10 of FIGURES 1 through 3 is replaced by a ball or spherical bead 21. The spring arm 11b is inserted through a diametrically extending hole 22 in the bead 21 so that the bead 21 is free to rotate about the spring arm 11b. A notch or slot 23 is cut through the outer surface of the spherical bead 21 in a great circle plane of said spherical bead, said great circle plane being angularly disposed with reference to the axis of the diamertic hole 22.

To operate the hook mechanism 10' after the hook 15a has been baited, the mechanism is held with the spring 12 in the unstressed condition between the thumb and forefinger of one hand. The thumb and forefinger of the other hand is then used to cross the arm 11a over the bead 21 and seat said arm in the slot 23, as shown in FIGURES 4 and 5. The spring 12 is now under tension whereby a torsion loading is transmitted to the spring arm 11a, and said arm is urged radially into the slot 23 thereby locking the arm 11a in position.

At this point, any significant pressure applied by the mouth of a fish or other animal to the mechanism 10' will impose a circumferential component to the force of the spring arm 11a against the bead 21 whereby the bead 21 will rotate about the spring arm 11b until the retained arm 11a is released from the slot 23 and springs open. The triggering threshold of the mechanism 10' can be varied by variations in the depth and angular disposition of the slot 23.

A suitable bead is a plastic ball of one-fourth inch diameter, with the slot 23 extending substantially to the center thereof and at an angle of approximately 36° to the axis of the hole 22. The angle $\theta$ between the spring arms 11a and 11b in the retained loaded state is then also approximately 36°. Thus the operation of the spring mechanism 10' is similar to that of the spring mechanism 10; however, the cost of manufacture will generally be less as the operation for forming the locking loop 13 of hook mechanism 10 is eliminated. It is to be understood that the locking bead 21 may also be used with barbed hooks 15a and 15b as shown in FIGURES 1 and 2, in which case the bead would generally be located further from the roll pin 16a than is shown in FIGURE 4.

Figure 6:
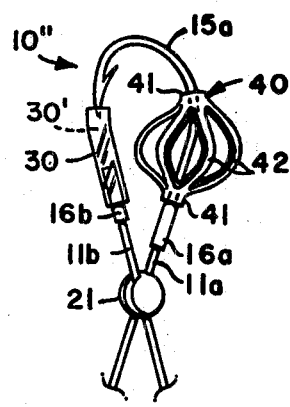
FIGURE 6 is a fragmentary elevational view of a modification of the spring-loaded hook mechanism of FIGURE 4, shown in the loaded condition and including both a bait holder in accordance with the present invention and also a sleeve-type snag guard in accordance with the present invention.

FIGURE 6 illustrates a modification 10" of the hook mechanism 10 of FIGURES 4 and 5. In this modification the bead-type snag guard 20 is replaced by a sleeve 30, made of Teflon, fluorocarbon or other suitable material, and fitted over the roll pin 16b at the end of the spring arm 11b so that a portion of said sleeve 30 extends beyond the end of the arm 11b to form an open cavity 30'. In the retained loaded position, the pointed end of the hook 15a is positioned inside the cavity, thereby guarding against snagging of the hook on weeds and other objects.

Figure 7:
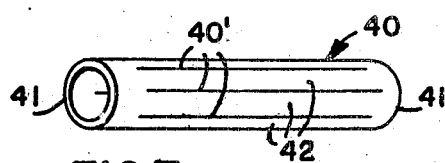
FIGURE 7 is an enlarged perspective view of the bait holder included in FIGURE 6 shown as detached from the hook mechanism.

Also in the hook mechanism 10" of FIGURE 6, a flexible bait holder 40 is provided. As seen in FIGURE 7, the bait holder 40 is formed from a plastic or rubber tube 40 having longitudinal cuts 40' therethrough extending from annular borders 41 at each end of the tube 40. The tube 40 is then placed over the shank of the hook 15a with the end portions 41 advanced toward each other whereby the longitudinally-extending portions 42 of the tube 40, between the cuts 40', are flexed outward to form a series of integral resilient bands depending from the end portions 41, which end portions now function as retaining rings on the shank of the hook 15a. Soft bait, such as clams, worms, fish, shrimp, insects or marshmallows, is inserted within the flexed slotted tube 40 and is retained therein by the bands 42. Thus the bait does not become dislodged during casting operations or upon triggering of the spring 12, and the bait is protected against stealing. It is apparent that this bait holder is generally useful with all types of fish hooks.

Figure 8:
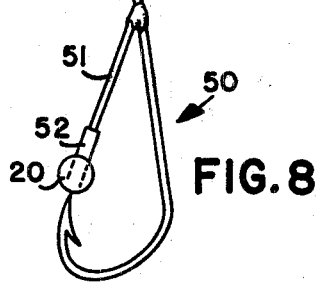
FIGURE 8 is an elevational view of a conventional hook also with a sleeve-type snag guard in accordance with the present invention.

FIGURE 8 shows a conventional fish hook 50, modified by the provision of a short length of spring wire 51 having a roll pin 52 on one thereof with a bead 20, as described with reference to FIGURE 4, mounted over the roll pin 52. The other end of the wire 51 is soldered, or otherwise secured, to the shank of the hook 50 so as to position the bead 20 closely adjacent the pointed end of the hook 50 and thereby guard against snagging on weeds and other objects. When a fish strikes, the wire 51 will flex to move the guard 20 away from the point of the hook. Alternatively, the bead-type snag guard 20 in FIGURE 8 may be replaced by a sleeve-type snag guard 30 as described with reference to FIGURE 6.

Having thus described my invention, what I claim as new and desire to protect by Letters Patent is:

1. A hook mechanism for capturing animals, comprising: a torsion spring having at least one loop intermediate two spring arms disposed in angular relationship when said spring is in an unstressed condition; a hook fixedly secured to the end of at least one of said spring arms; and means releasably retaining said arms in a crossed position with said spring being under tension and transmitting a torsion loading through said spring arms, said means being releasable upon the application of pressure to said mechanism for springing said spring arms back to said unstressed condition, and wherein said releasably retaining means comprises a spherical body rotatably mounted on one of said spring arms along a diameter of said spherical body, said body having a slot cut through the surface thereof in a great circle plane of said spherical body, said plane being angularly disposed with respect to said diameter whereby the other of said spring arms is retained in said slot upon the crossing of the two spring arms and is released by rotation by said body when pressure is applied to said mechanism.

2. A hook mechanism for capturing animals, comprising: a torsion spring having at least one loop intermediate two spring arms disposed in angular relationship when said spring is in an unstressed condition; a hook fixedly secured to the end of at least one of said spring arms; means releasably retaining said arms in a crossed position with said spring being under tension and transmitting a torsion loading through said spring arms, said means being releasable upon the application of pressure to said mechanism for springing said spring arms back to said unstressed condition; and a bait holder disposed around the shank of said hook, said bait holder comprising: a resilient tube having a series of longitudinally extending cuts extending from an annular border at one end of said tube to an annular border at the other end of said tube whereby said annular borders form retaining rings for flexed bands formed by the portions of said tube between said longitudinally extending cuts, said bands serving to retain the bait inside of said flexed tube.

References Cited

UNITED STATES PATENTS

| | | | |
|---|---|---|---|
| 1,306,383 | 6/1919 | Lindquist | 43—43.4 |
| 2,284,034 | 5/1942 | Binkowski | 43—36 |
| 2,513,548 | 7/1950 | Buss | 43—44.8 |
| 2,576,795 | 11/1951 | Lane | 43—43.6 X |
| 2,932,114 | 4/1960 | Meucci | 43—43.6 |

SAMUEL KOREN, Primary Examiner

D. J. LEACH, Assistant Examiner

U.S. Cl. X.R.

43—41, 43.4, 43.6, 44.8, 44.4